(12) United States Patent
Rose et al.

(10) Patent No.: US 7,707,312 B2
(45) Date of Patent: Apr. 27, 2010

(54) PRINTER DISCOVERY PROTOCOL SYSTEM AND METHOD

(75) Inventors: Laurence Rose, Oak Park, CA (US); Vincent Magret, Oak Park, CA (US)

(73) Assignee: Alcatel Lucent, Paris (FR)

( * ) Notice: Subject to any disclaimer, the term of this patent is extended or adjusted under 35 U.S.C. 154(b) by 1178 days.

(21) Appl. No.: 10/749,993

(22) Filed: Dec. 31, 2003

(65) Prior Publication Data

US 2005/0198383 A1    Sep. 8, 2005

(51) Int. Cl.
  *G06F 15/16*   (2006.01)
(52) U.S. Cl. ........... 709/245; 709/220; 709/224; 340/825.52; 340/825.57
(58) Field of Classification Search .......... 709/224, 709/245, 220; 340/825.52, 825.57; 710/3–317; 711/1–211
See application file for complete search history.

(56) References Cited

U.S. PATENT DOCUMENTS

| 6,061,334 | A  | * | 5/2000 | Berlovitch et al. | 370/255 |
|---|---|---|---|---|---|
| 6,067,334 | A  | * | 5/2000 | Bostica et al. | 375/373 |
| 6,262,988 | B1 | * | 7/2001 | Vig | 370/401 |
| 7,095,738 | B1 | * | 8/2006 | Desanti | 370/389 |
| 2002/0112076 | A1 | * | 8/2002 | Rueda et al. | 709/245 |
| 2005/0114507 | A1 | * | 5/2005 | Tarui et al. | 709/224 |

FOREIGN PATENT DOCUMENTS

WO    WO 03/067821 A1  *  8/2003

* cited by examiner

*Primary Examiner*—Yves Dalencourt
*Assistant Examiner*—Michael C Lai
(74) *Attorney, Agent, or Firm*—Galasso & Associates, LP (57) ABSTRACT

A protocol for discovering a silent device, such as a printer, attached to a mobile port of a switching node. A command is transmitted to the switching node for associating an IP address for the silent device to a particular virtual local area network (VLAN). Entry of the command causes the switching node to start searching for the silent device on the mobile ports. As part of the searching process, an ARP request with the IP address provided in the command is sent to each mobile port of the switching node. When the silent device responds with its MAC address in an ARP reply message, the MAC address is learned in a layer 2 table used for making forwarding decisions of data units received by the switching node. Furthermore, the port where the silent device was discovered, that is, the port receiving the ARP reply message, is associated with the VLAN of the silent device.

19 Claims, 6 Drawing Sheets

PRINTER DISCOVERY PROTOCOL SYSTEM AND METHOD

FIELD OF THE INVENTION

The present invention relates generally to virtual local area networks (VLANs), and more particularly, to dynamic association of mobile ports to different VLANs based on the VLAN membership of the devices attached to the ports.

BACKGROUND OF THE INVENTION

One common method of interconnecting multiple local area networks (LANs) is via one or more media access control (MAC) bridges. The bridged LAN that is generated as a result of such interconnection allows end devices attached to separate LANs to communicate with each other as if they were attached to a single LAN. IEEE Standard 802.1D entitled "IEEE Standard for Information Technology—Telecommunications and Information Exchange Between Systems—IEEE Standard for Local and Metropolitan Area Networks—Common Specifications—Media Access Control (MAC) Bridges," 1998 Edition, the content of which is incorporated herein by reference, specifies a general method for the operation of such MAC bridges.

Bridged LANs may be extended to support virtual local area networks (VLANs). In virtual bridged LANs, data units (e.g. packets or frames) are classified into virtual LANs (VLANs) in order to differentiate service within a bridged LAN. IEEE Draft standard 802.1Q entitled "IEEE Standard for Local and Metropolitan Area Networks—Virtual Bridge Local Area Networks," 1998, and IEEE Draft Standard 802.1V entitled "IEEE Standard for Local and Metropolitan Area Networks—Virtual Bridged Local Area Networks—Amendment 2: VLAN Classification by Protocol and Port," 2001, the contents of which are hereby incorporated by reference, provide standard VLAN classification rules.

In general terms, IEEE 802.1Q provides VLAN tagging rules for optionally adding a tag header including an assigned VLAN identifier (ID) to a data unit prior to transmitting it on an egress port. Tags are applied or not depending on the VLAN of the data unit. The egress port tags the data unit unless the VLAN of the data unit belongs to an untagged set of VLANs. In this instance, the data unit is transmitted without the VLAN tag header via an untagged egress port.

Bridges in a virtual bridged LAN may include switch ports configured as non-mobile or mobile ports. Non-mobile ports may be assigned to a default VLAN for switching untagged traffic. Generally only one default VLAN may be authorized per port.

In order to support more than one VLAN per port, a network administrator may choose to tag a particular port with one or more VLAN identifiers. In this case, the bridge switches tagged traffic with a VLAN identifier matching a VLAN identifier tagged to the port. One drawback with tagged ports, however, is that the network administrator must generally know in advance the traffic that will be flowing through the tagged ports in order to tag the ports in an appropriate manner.

Mobile ports were thus designed to overcome this deficiency. One of the benefits of mobile ports is that they may be dynamically associated with different VLANs based on the traffic flowing through them. In this regard, mobile ports are generally configured with one or more VLAN rules that are examined for a match upon receipt of traffic through the port. If the traffic matches a VLAN rule configured on the port, the port becomes a member of that VLAN. If the traffic does not match a configured VLAN rule, the mobile port remains associated with a default VLAN. The mobile port may also belong to more than one VLAN if the port carries traffic, that is, different flows, matching different VLAN rules.

Once the VLAN rules have been configured on the mobile ports, mobile devices may be moved transparently in a given set of mobile ports, where the same VLAN rules apply on that set of ports. Such dynamic configuration, however, generally requires that the mobile device transmit traffic in order to be classified into a desired VLAN. Silent mobile devices such as, for example, printers, do not generally transmit traffic that will allow the VLAN classification. Thus, when a silent mobile device is connected to a mobile port, the mobile port remains associated to its default VLAN, and no dynamic association of the port to the VLAN of the attached device occurs. As a result, unless the silent mobile device is a member of the default VLAN, it remains unreachable to the other devices given that the port does not forward traffic on a VLAN different than the VLAN to which it is associated.

Accordingly, what is desired is a system and method for dynamically associating a mobile port based on the VLAN membership of a device connected to the port, even when the device does not initiate traffic that may be examined by the port to allow such dynamic association via traditional mechanisms.

SUMMARY OF THE INVENTION

According to one embodiment, the present invention is directed to a method for dynamically associating one of the ports of a switching node to a virtual local area network (VLAN) based on a VLAN membership of a device connected to the port. The method includes receiving a command associating the device to the VLAN; transmitting to the plurality of ports in response to the command, a first message configured to generate a response by the device; receiving at a particular port, a second message from the device responsive to the first message; identifying the port receiving the second message; and associating the identified port to the VLAN associated with the device.

According to another embodiment, the present invention is directed to a switching node including a port coupled to a device associated with a virtual local area network (VLAN); means for receiving a command associating the device to the VLAN; means for transmitting to the port in response to the command, a first message configured to generate a response by the device; means for receiving at the port, a second message from the device responsive to the first message; means for identifying the port receiving the second message; and means for associating the identified port to the VLAN associated with the device.

In yet another embodiment, the present invention is directed to a switching node including one or more ports receiving and transmitting data units; a first table storing a list of addresses learned on the one or more ports; a first module coupled to the first table; and a second module coupled to the first module. According to this embodiment, the first module detects a triggering event, removes an address from the list of addresses stored in the first table based on the triggering event, determines whether the address is associated with a silent device configured to respond to traffic transmitted by another device but not configured to initiate traffic to other devices, and forwards the address to the second module based on the determination. The second module transmits to the one or more ports a first message configured to generate a response by the silent device associated with the forwarded address. The first module receives at a particular port, a second message from the silent device responsive to the first message, identifies the particular port receiving the second message, and associates the identified port to a VLAN associated with the silent device.

It should be appreciated, therefore, that the claimed system and method allows silent devices to be discovered automatically, allowing them to be reachable even when they move from one mobile port to another.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
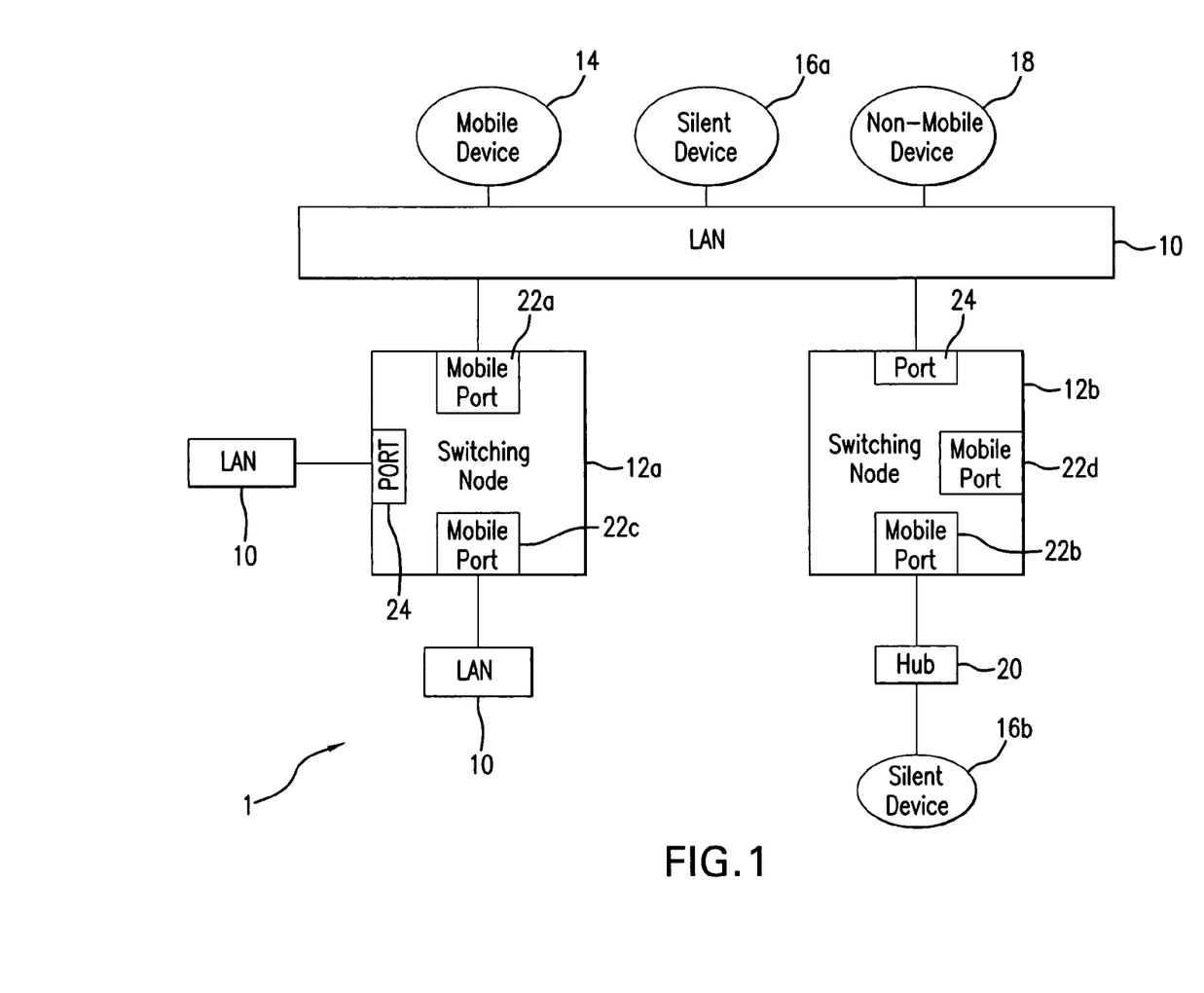
FIG. 1 is a schematic block diagram of a virtual bridged LAN according to one embodiment of the invention.

FIG. 1 is a schematic block diagram of a virtual bridged LAN 1 according to one embodiment of the invention. The virtual bridged LAN 1 includes one or more LANs 10a, 10b, hubs 20, and edge devices 16a, 16b, 18 interconnected to each other via a switching node 12. The switching node 12 may be, for example, a virtual local area network (VLAN) MAC bridge such as, for example, a VLAN MAC bridge as described in IEEE 802.1Q and 802.1V. Exemplary VLAN MAC bridges are sold by Alcatel under the trademark Omniswitch.

In the illustrated embodiment, the switching node 12 includes one or more mobile ports 22a, 22b, and 22c (collectively referenced at 22) and one or more non-mobile ports 24a, 24b, 24c (collectively referenced at 24). The non-mobile ports 24 may be either tagged or untagged as is described in further detail in IEEE 802.1Q. Generally, if the non-mobile ports 24 are untagged, they are assigned a default VLAN for switching untagged traffic. If the non-mobile ports 24 are tagged, they are used to switch tagged traffic having VLAN IDs that match the VLAN IDs tagged to the port.

Unlike non-mobile ports, mobile ports 22 are configured to be dynamically associated with different VLANs based on the VLAN membership of the devices attached to these ports. This allows the edge devices 16a, 16b (collectively referenced at 16) coupled directly or indirectly to the mobile ports 22, to transparently move from one mobile port to another while maintaining their VLAN classification.

According to one embodiment of the invention, the edge devices 16a, 16b coupled to the mobile ports include silent edge devices. Silent devices are edge devices that are capable of responding to traffic transmitted by other devices, but that do not initiate traffic on their own. An exemplary silent device is a printer. Because silent devices do not initiate traffic on their own, a printer discovery protocol (PDP) is employed according to one embodiment of the invention, for discovering silent devices that are attached to the mobile ports, and dynamically associating such ports to the VLAN of the silent devices. Although the protocol is referred to as a "printer" discovery protocol, a person of skill in the art should recognize that the PDP process also applies to other silent devices conventional in the art.

For example, assume that device 16a is a printer that was originally connected to mobile port 22a but is now reconnected to mobile port 22c. Also assume that the printer is associated with a VLAN having a VLAN ID of "5." When the move occurs to mobile port 22c, the switching node 12 engages in the PDP process for automatically discovering that the printer is now attached to mobile port 22c and that the printer is associated with a VLAN ID of "5," and automatically associating mobile port 22c to this VLAN.

Figure 2:
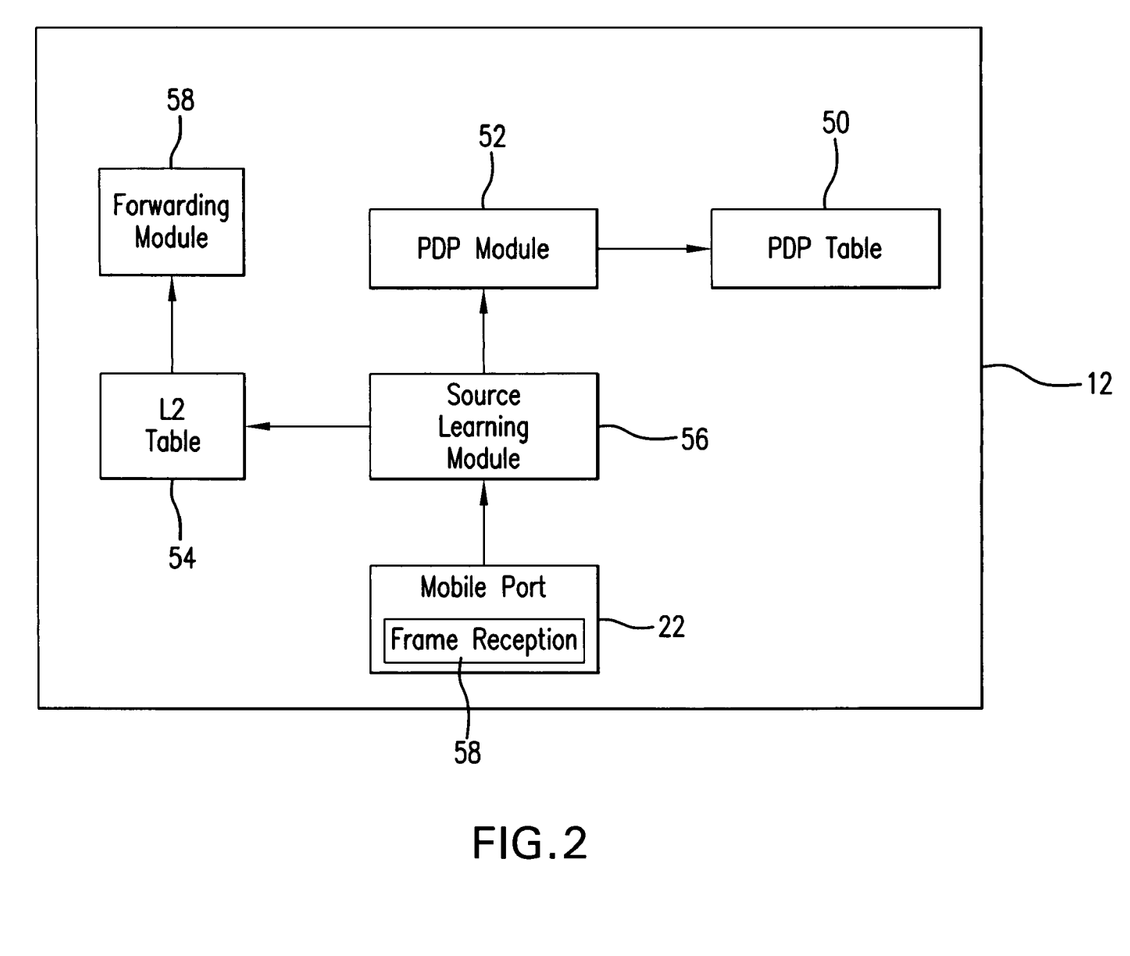
FIG. 2 is a schematic block diagram of a switching node capable of engaging in a printer discovery protocol (PDP) process according to one embodiment of the invention.

FIG. 2 is a more detailed schematic block diagram of the switching node 12 of FIG. 1 according to one embodiment of the invention. The mobile port 22 that is configured in the switching node 12 includes a reception/transmission module 58 for receiving and transmitting data units (e.g. packets and frames) via the port. The switching node 12 further includes a source learning module 56, a layer 2 (L2) table 54, also referred to as a filtering database, and a forwarding module 58, the functions of which are described in further detail in IEEE 802.1D, as modified by 802.1Q and 802.1V. In general terms, the source learning module 56 inspects the MAC source address of data units received via port 22, obtains the VLAN ID associated with the MAC source address, and creates or updates entries in the L2 table, associating the port on which the data unit was received with its MAC source address and VLAN ID. The L2 table further stores filtering information used by the forwarding module 58 to determine whether data units with a particular destination MAC address and VLAN ID should be forwarded to a given port.

The switching node 12 also includes a PDP module 52 coupled to the source learning module 56. The PDP module is configured to run the PDP process and discover the silent devices attached to the mobile ports 22 of the switching node. The PDP process is run with the aid of a PDP table 50 storing the IP addresses and associated VLAN IDs of the silent devices known to the switching node.

The various modules and tables of the switching node 12 may be implemented via any combination of software, hardware, and/or firmware (e.g. ASIC).

Figure 3:
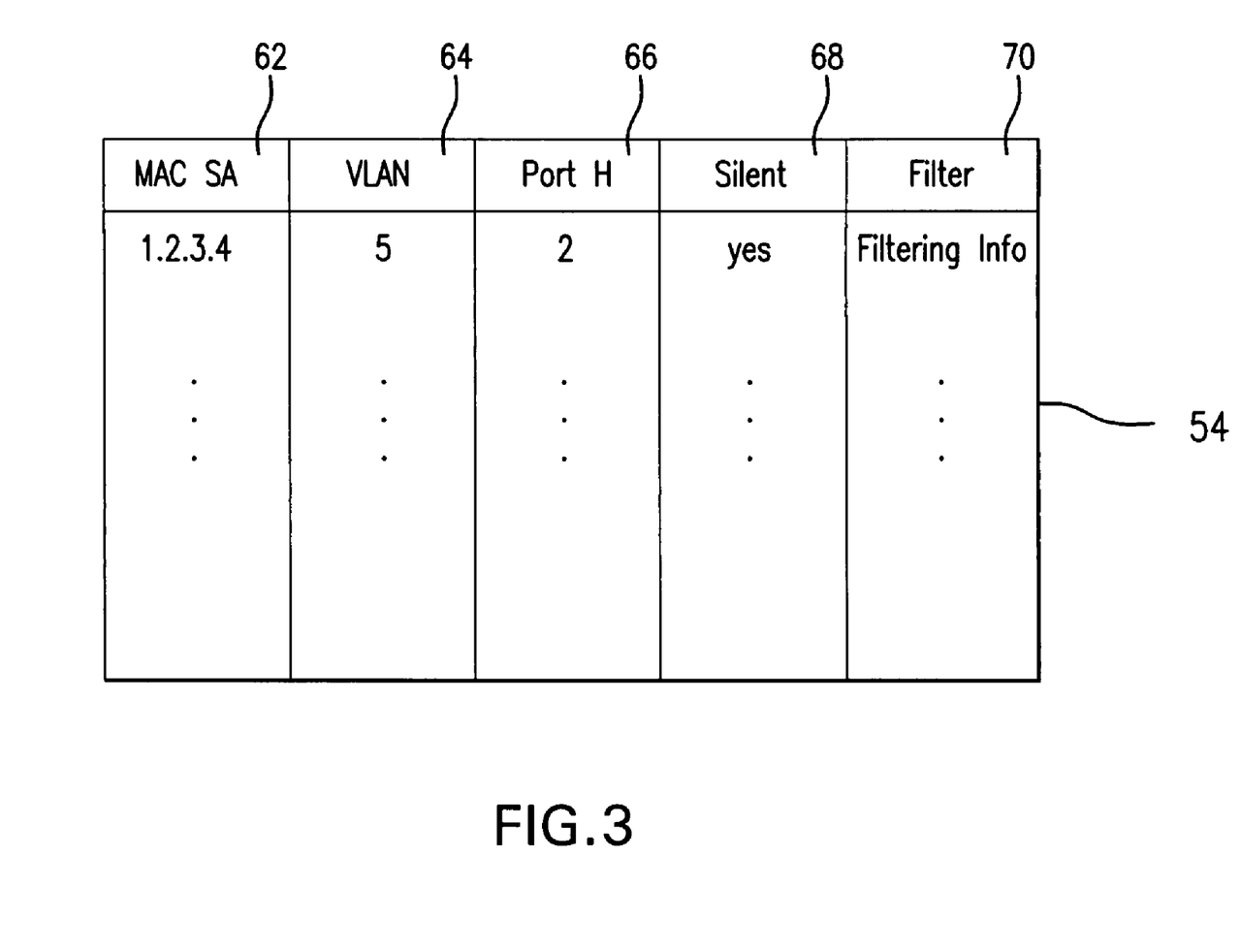
FIG. 3 is a simplified layout diagram of a layer 2 table according to one embodiment of the invention.

FIG. 3 is a simplified layout diagram of the L2 table 54 according to one embodiment of the invention. The L2 table includes one or more entries where each entry includes a MAC source address 62, VLAN ID 64, and port number 66 associated with the MAC source address and VLAN ID. A silent field 68 for each entry indicates whether the entry is associated with a silent device. Each entry further includes filtering information 70 used by the forwarding module 58 in deciding whether to forward or filter particular data units.

According to one embodiment of the invention, entries in the L2 table associated with the silent devices are dynamic entries created and updated by the source learning module 56 as MAC source addresses are learned on the different mobile ports 22. Dynamic entries, unlike static entries, are automatically removed after a specified time, referred to as an ageing time, has elapsed since the entry was created or last updated.

Figure 4:
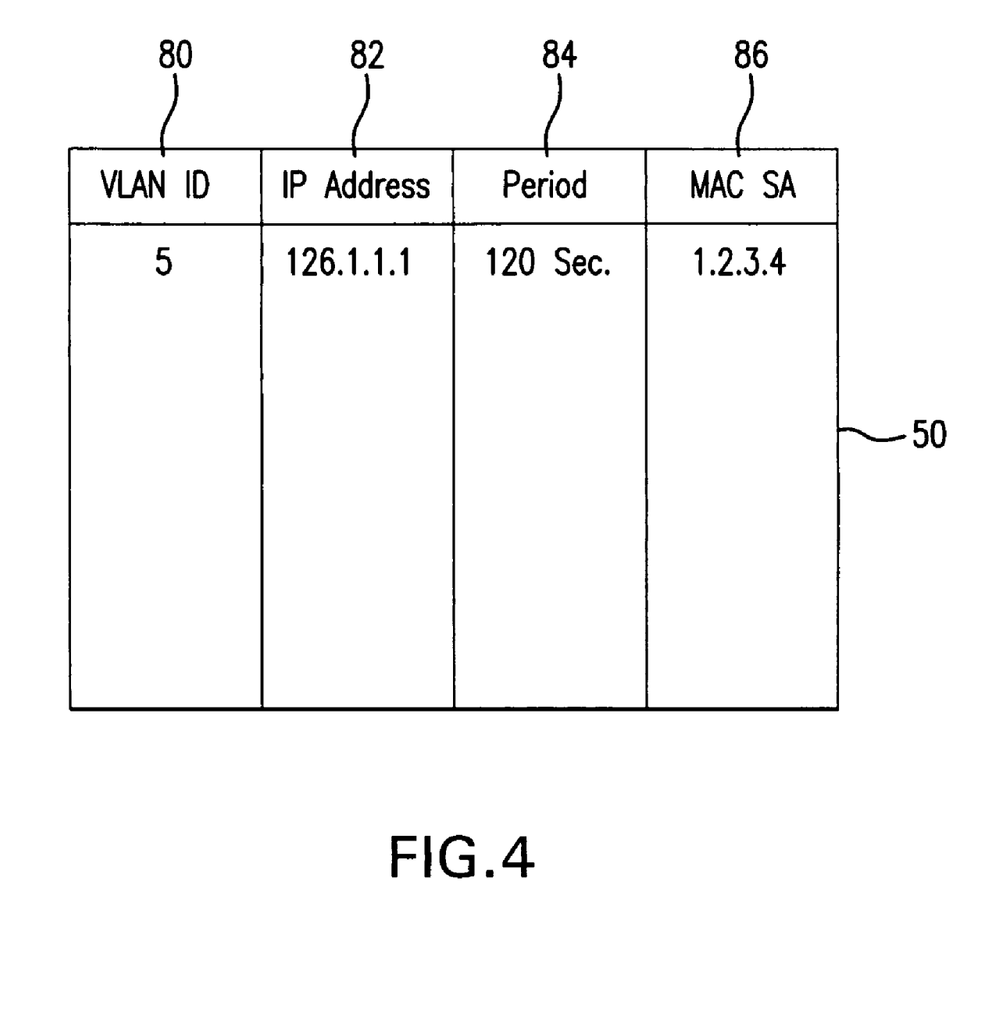
FIG. 4 is a simplified layout diagram of a PDP table according to one embodiment of the invention.

FIG. 4 is a simplified layout diagram of the PDP table 50 according to one embodiment of the invention. The PDP table includes for each silent device, a VLAN ID 80, an Internet Protocol (IP) address 82, an optional polling period 84, and the device's MAC source address 86. The VLAN ID, IP address, and polling period are obtained from a command transmitted by a network administrator to associate the silent device to a desired VLAN.

Figure 5:
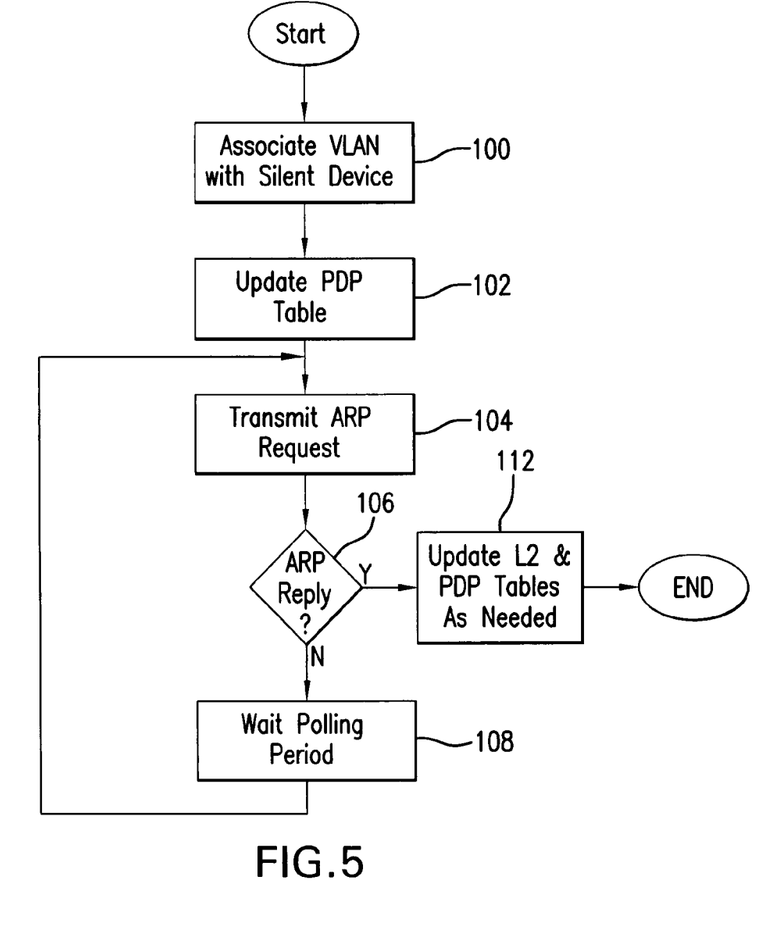
FIG. 5 is a flow diagram of a PDP process according to one embodiment of the invention.

FIG. 5 is a flow diagram of the PDP process according to one embodiment of the invention. The process starts with a silent device directly or indirectly connecting to a particular mobile port 22 of the switching node 12. If the silent device has not yet been registered to a particular VLAN, the network administrator, in step 100, transmits a command, referred to as a PDP command, indicating an address, such as, for example, an IP address, of the silent device, and a VLAN identifier to which the silent device is to be associated. The PDP command further indicates that the device is a silent device. The PDP command may also optionally include a polling period that indicates a number of seconds to wait before the device is polled during a PDP process. The PDP command may be formatted as follows:

"vlan vid ip ip_address silent [period] [period_in_seconds]"

The entry of the PDP command invokes the PDP module 52 for implementing the PDP process on the mobile ports of the particular switching node. In this regard, in step 102, the PDP module 52 stores in the PDP table 50 the VLAN ID, IP address, and polling period transmitted in the PDP command. Because the MAC address associated with the silent device is unknown initially, it is left for updating once it becomes known.

In step 104, the PDP module 52 engages in one of the well-known address learning protocols such as, for example, an Address Resolution Protocol (ARP), for learning the MAC source address associated with the IP address of the silent device. In this regard, the PDP module 52 transmits an ARP request message with the IP address, to each mobile port 22 of the switching node 12.

In step 106, the PDP module 52 determines whether an ARP reply was received in response to the ARP request. If the answer is NO, the PDP module 52 waits until the polling period indicated in the PDP command has expired before polling the ports again with another ARP request.

If the silent device 16 responds with an ARP reply message, the PDP module 52 and the source learning module 56 respectively update the PDP and L2 tables in step 112. In this regard, the source learning module 56 performs its routine source learning function described in detail in IEEE 802.1D, as modified by IEEE 802.1Q and IEEE 802.1V, and retrieves the MAC source address from the ARP reply message. The source learning module 56 further observes the port in which the silent device was discovered, that is, the port receiving the ARP reply message. The source learning module 56 also contacts the PDP module 52 for obtaining the VLAN ID associated with the IP address returned in the ARP reply message from the PDP table 50.

The retrieved MAC source address and VLAN ID, as well as the observed port number, are stored in the L2 table for use by the forwarding module 58 for forwarding data units to the silent device. The source learning module 56 further records the entry as being associated with a silent device. The creation of an entry in the L2 table for the silent device allows it to be reachable to other devices in the same VLAN.

The source learning module 56 also forwards the ARP reply message to the PDP module 52. The PDP module 52 receives the ARP reply message and, if necessary, updates the PDP table 50 by storing the MAC address in the ARP reply message, in the MAC source address field associated with the silent device's IP address. The ARP reply message is then forwarded to the standard ARP process to allow it to perform its standard ARP processing.

There are several triggering events that may cause a PDP process to be re-invoked after a silent device has been discovered on a particular port via the PDP process described with respect to FIG. 3. One situation is when the silent device moves from one mobile port to another. Another situation is when an entry in the L2 table associated with a silent device ages out. A further situation is when a link is disconnected from the mobile port to which the silent device was connected.

Figure 6:
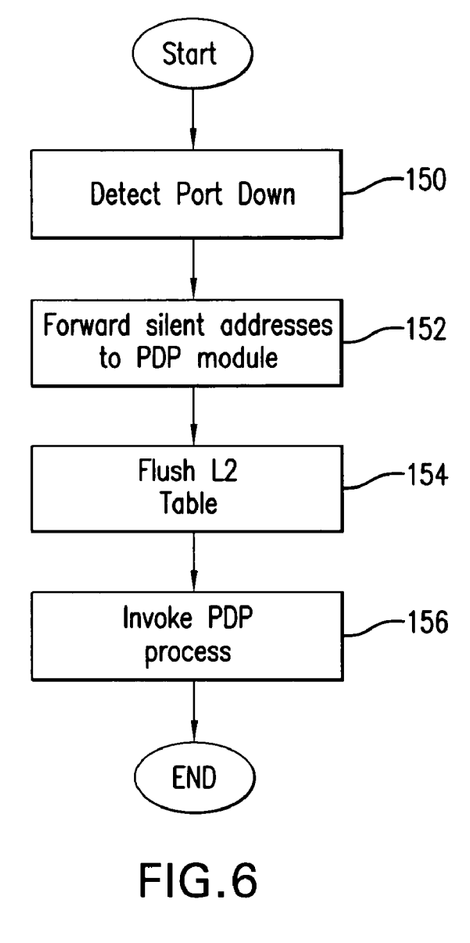
FIG. 6 is a flow diagram of a process of rediscovering a silent device directly attached to a first mobile port when it moves to a second mobile port according to one embodiment of the invention.

FIG. 6 is a flow diagram of a process for rediscovering a silent device directly attached to a first mobile port when it moves to a second mobile port according to one embodiment of the invention. The process starts, and in step 150, a port down event is trapped via software when the silent device is disconnected from the first mobile port. In step 152, the source learning module 56 retrieves all MAC source addresses learned in the L2 table 54 that are indicated in the silent field 68 as being associated with a silent device, and forwards these addresses to the PDP module 52. The source learning module 56 then engages in its standard source learning process and in step 154, flushes from the L2 table 54 all addresses learned on the first mobile port.

The notification from the source learning module with the MAC source addresses invokes the PDP process in step 156. In this regard, the PDP module 52 retrieves from the PDP table 50, the IP addresses associated with the received MAC source addresses and their respective polling time periods, and executes steps 104-108 of FIG. 3, for learning the MAC source addresses again on any new mobile ports to which the silent devices may have been reconnected. As each MAC source address is learned on a particular mobile port, a corresponding entry with the silent device's MAC source address, VLAN ID, and port number, is entered into the L2 table.

If, however, the silent device is behind a hub when it is disconnected, no port down event is trapped. In this scenario, the PDP process for re-discovering the silent device on a new port is invoked when the MAC source address associated with the silent device ages out from the L2 table 54. In this scenario, the source learning module 56 recognizes by querying the silent field 68 in the L2 table, that the aged out MAC source address is associated with a silent device. The MAC source address is thus forwarded to the PDP module 52, and the entry in the L2 table associated with the address, removed.

The PDP module 52 receives the MAC source address and retrieves from the PDP table 50, the associated IP address and polling period. Steps 104-108 of FIG. 3 are then re-executed for re-discovering the silent device. In this regard, ARP requests are sent on all mobile ports for the retrieved IP address. This allows the source learning module 56 to learn the MAC source address on a new port if the silent device has since reconnected to a new port, in a manner that is transparent to the user.

If the network administrator does not wish to wait for the MAC source address to age out before re-discovering the silent device, the administrator may manually re-enter a PDP command for the silent device. Entry of the PDP command automatically invokes the PDP process for the silent device. If there are no ongoing pollings for the IP address associated with the silent device when the PDP command is entered, a new PDP process is invoked on the mobile ports with the IP address. However, if a previous polling for the IP address is ongoing, invoking a new PDP process may result in several concurrent pollings for the same IP address. To avoid this situation, instead of invoking a new PDP process, a previously launched polling is accessed and used instead of a new polling.

In either situation, as soon as the silent device answers with an ARP reply, the source learning module 56 updates the L2 table by deleting a previous L2 entry having the device's MAC address and VLAN ID for a previous port, and generating a new entry having the same MAC and VLAN ID, but for a new port. The silent field 68 is also set for the new entry to indicate that it is associated with a silent device. Alternatively, the source learning module may only replace the old port information with the new port information instead of deleting and re-creating entire L2 entries.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a network including a switching node having a plurality of ports, a method for dynamically associating one of the ports to a virtual local area network (VLAN) based on a VLAN membership of a device connected to the port, the device being a silent device that responds to traffic transmitted by another device but does not initiate traffic to the other device, the method comprising:

receiving at the switching node a command from a network administrator associating the device to the VLAN wherein the switching node has a mobile port containing a frame reception and transmission module and also has a source learning module coupled to a layer 2 table which is coupled to a forwarding module and a printer discovery protocol (PDP) module coupled to the source learning module and a PDP table;

transmitting to the plurality of ports in response to the command, a first message configured to generate a response by the device;

receiving at a particular port, a second message from the device responsive to the first message;

identifying the port receiving the second message; and associating the identified port to the VLAN associated with the device and updating the layer 2 table and the PDP table.

2. The method of claim 1, wherein the device is a printer.

3. The method of claim 1 further comprising storing a list of addresses learned on the identified port.

4. The method of claim 3, wherein the second message includes an address associated with the device, the method further comprising including the address in the list of addresses learned on the identified port.

5. The method of claim 4, further comprising:

detecting a triggering event removing the address associated with the device from the list of addresses learned on the identified port;

determining whether the device associated with the address is a silent device configured to respond to traffic transmitted by another device but not configured to initiate traffic to other devices;

transmitting to the plurality of ports based on the determination, a third message configured generate a response by the device;

receiving at a second port, a fourth message from the device responsive to the third message;

identifying the second port receiving the fourth message; and associating the second port to the VLAN associated with the device.

6. The method of claim 5, wherein the triggering event is a port down event.

7. The method of claim 6, wherein the port down event is generated in response to the device being decoupled from the identified port.

8. The method of claim 5, wherein the triggering event is fulfillment of an aging time for removing the address.

9. A switching node comprising:

a port coupled to a device associated with a virtual local area network (VLAN), the device being a silent device that responds to traffic transmitted by another device but does not initiate traffic to other device;

means for receiving at the switching node a command from a network administrator associating the device to the VLAN wherein the port of the switching node contains a frame reception and transmission module and the switching node also has a source learning module coupled to a layer 2 table which is coupled to a forwarding module and a printer discovery protocol (PDP) module coupled to the source learning module and a PDP table;

means for transmitting to the part in response to the command, a first message configured to generate a response by the device;

means for receiving at the port, a second message from the device responsive to the first message;

means for identifying the port receiving the second message; and means for associating the identified port to the VLAN associated with the device and updating the layer 2 table and the PDP table.

10. The switching node of claim 9, wherein the device is a printer.

11. The switching node of claim 9 further comprising means for storing a list of addresses learned on the identified port.

12. The switching node of claim 11, wherein the second message includes an address associated with the device, the switching node further comprising means for including the address in the list of addresses learned on the identified port.

13. The switching node of claim 12, further comprising:

means for detecting a triggering event removing the address associated with the device from the list of addresses learned on the identified port;

means for determining whether the device associated with the address is a silent device configured to respond to traffic transmitted by another device but not configured to initiate traffic to other devices;

means for transmitting to the plurality of ports based on the determination, a third message configured generate a response by the device;

means for receiving at a second port, a fourth message from the device responsive to the third message;

means for identifying the second port receiving the fourth message; and means for associating the second port to the VLAN associated with the device.

14. The switching node of claim 13, wherein the triggering event is a port down event.

15. The switching node of claim 14, wherein the port down event is generated in response to the device being decoupled from the identified port.

16. The switching node of claim 13, wherein the triggering event is fulfillment of an aging time for removing the address.

17. A switching node comprising:
   one or more ports receiving and transmitting data units containing a frame reception and transmission module;
   a first table storing a list of addresses learned on the one or more ports;
   a first module coupled to the first table; and
   a second module coupled to the first module, characterized in that the first module detects a triggering event, removes an address from the list of addresses stored in the first table based on the triggering event, determines whether the address is associated with a silent device configured to respond to traffic transmitted by another device but not configured to initiate traffic to other devices, and forwards the address to the second module based on the determination, further characterized in that the second module transmits to the one or more ports a first message configured to generate a response by the silent device associated with the forwarded address, also characterized in that the first module receives at a particular port, a second message from the silent device responsive to the first message, identifies the particular port receiving the second message, and associates the identified port to a VLAN associated with the silent device;
   a second table for storing the IP address and associated VLAN ID of the silent device;
   a third module coupled to the first table for forwarding data units; and
   wherein the first module updates the first table and the second module updates the second table after receipt of the second message.

18. The switching node of claim 17, wherein the triggering event is a port down event.

19. The switching node of claim 17, wherein the triggering event is fulfillment of an aging time for removing the address.

* * * * *